(12) United States Patent
Pu et al.

(10) Patent No.: US 10,151,825 B2
(45) Date of Patent: Dec. 11, 2018

(54) RADAR DETECTION SYSTEM

(71) Applicant: HTC Corporation, Taoyuan County (TW)

(72) Inventors: Ta-Chun Pu, Taoyuan County (TW); Chun-Yih Wu, Taoyuan County (TW); Yen-Liang Kuo, Taoyuan County (TW)

(73) Assignee: HTC Corporation, Taoyuan (TW)

( * ) Notice: Subject to any disclaimer, the term of this patent is extended or adjusted under 35 U.S.C. 154(b) by 644 days.

(21) Appl. No.: 14/460,366

(22) Filed: Aug. 15, 2014

(65) Prior Publication Data

US 2016/0047909 A1    Feb. 18, 2016

(51) Int. Cl.
*G01S 7/03* (2006.01)
*G01S 13/48* (2006.01)
*G01S 7/41* (2006.01)

(52) U.S. Cl.
CPC .............. *G01S 7/032* (2013.01); *G01S 7/034* (2013.01); *G01S 13/48* (2013.01); *G01S 7/415* (2013.01)

(58) Field of Classification Search
CPC ... H04B 1/44; G01S 2013/0245; G01S 13/48; G01S 7/032; G01S 7/034; G01S 7/415
See application file for complete search history.

(56) References Cited

U.S. PATENT DOCUMENTS 5,008,678 A * 4/1991 Herman .................. G01S 7/032
342/158
5,363,109 A * 11/1994 Hofgen ..................... G01S 7/40
342/31
6,229,483 B1 * 5/2001 Loostrom .............. H01Q 3/267
342/174

(Continued)

FOREIGN PATENT DOCUMENTS

TW         201421804 A     6/2014

OTHER PUBLICATIONS

Adamidis et al. "Design and Implementation of a 4×4 Butler-Matrix Switched-Beam Antenna Array at the Microwave Communications and Electromagnetic Applications Lab of the Technological Educational Institute of Crete" 2005 WSEAS International Conference on Engineering Education. 6 pages. (Year: 2005).*

(Continued)

*Primary Examiner* — Matthew M Barker
(74) *Attorney, Agent, or Firm* — CKC & Partners Co., Ltd.

(57) ABSTRACT

A radar detection system that includes a signal transmitter, a signal receiver, a coupling module, two antennas and a switching module is provided. The coupling module includes a first and a second coupling paths each corresponding to a group of phase-shifting parameters. Under a first operation mode, the switching module connects the signal transmitter to the first coupling path to perform signal transmission from the two antennas along a first axis and connects the signal receiver to the second coupling path to perform signal receiving from the two antennas along a second axis. Under a second operation mode, the switching module connects the signal transmitter to the second coupling path to perform signal transmission from the two antennas along the second axis and connects the signal receiver to the first coupling path to perform signal receiving from the two antennas along the first axis.

8 Claims, 4 Drawing Sheets

(56) References Cited

U.S. PATENT DOCUMENTS

| | | | | |
|---|---|---|---|---|
| 7,183,995 B2* | 2/2007 | Pleva | ............... | G01S 7/032 |
| | | | | 342/374 |
| 7,227,474 B2* | 6/2007 | Zoratti | ............... | G01S 13/18 |
| | | | | 340/435 |
| 8,358,239 B2* | 1/2013 | Krich | ............... | G01S 13/582 |
| | | | | 342/174 |
| 9,182,485 B1* | 11/2015 | Andrews | ............... | H01Q 3/30 |
| 2013/0135137 A1 | 5/2013 | Mulder et al. | | |
| 2013/0234729 A1 | 9/2013 | Jau et al. | | |

OTHER PUBLICATIONS

Corresponding Chinese office action dated May 3, 2017.

\* cited by examiner

RADAR DETECTION SYSTEM

BACKGROUND

Field of Invention

The present invention relates to a radar detection technology. More particularly, the present invention relates to a radar detection system.

Description of Related Art

With the maturity of the development of sensing element technology, various kinds of sensors are applied to different kinds of fields of applications, such as human health management, mechanical automation control, meteoric ecological protection, traffic safety forewarning, etc. For example, the radar technology can measure the distance by using the transmission and receiving of the wireless signals such as electromagnetic wave and supersonic wave. The antenna first delivers the wireless signals for measuring the distance and receives the reflected wireless signals subsequently such that the distance between the radar and an object under measurement is calculated accordingly.

However, with the diversity of the applications grows, the radar system often uses antenna array and the feeding network having complex phase-shifting mechanism to change the transmission direction of the wireless signals to perform detection on different areas. However, the multi-region detection mechanism accomplished by using the antenna array and a multiple of phase-shifting circuits will greatly increase the volume and the cost of the detection system.

Accordingly, what is needed is a radar detection system to address the issues mentioned above.

SUMMARY

The invention provides a radar detection system that includes a signal transmitter, a signal receiver, a coupling module, two antennas and a switching module is provided. The coupling module includes a first and a second coupling paths each corresponding to a group of phase-shifting parameters, wherein the first and the second coupling paths are different. The two antennas are electrically connected to the first and the second coupling paths. The switching module is electrically connected between the coupling module and the signal transmitter and the signal receiver. Under a first operation mode, the switching module connects the signal transmitter to the first coupling path such that the signal transmitter performs signal transmission from the two antennas along a first axis through the first coupling path, and the switching module connects the signal receiver to the second coupling path such that the signal receiver performs signal receiving from the two antennas along a second axis different from the first axis through the second coupling path. Under a second operation mode, the switching module connects the signal transmitter to the second coupling path such that the signal transmitter performs signal transmission from the two antennas along the second axis through the second coupling path, and switching module connects the signal receiver to the first coupling path such that the signal receiver performs signal receiving from the two antennas along the first axis through the first coupling path.

Another aspect of the present invention is to provide a radar detection system that includes a signal transmitter, a signal receiver, a coupling module, a plurality of antennas and a switching module. The coupling module includes a plurality of coupling paths each corresponding to a group of phase-shifting parameters. The antennas are arranged in an array electrically connected to the coupling paths respectively. The switching module is electrically connected between the coupling module and the signal transmitter and the signal receiver. Under each of a plurality of operation modes, the switching module connects each of the signal transmitter and the signal receiver to one of the coupling paths such that the signal transmitter performs signal transmission through the antennas and the signal receiver performs signal receiving through the antennas.

These and other features, aspects, and advantages of the present invention will become better understood with reference to the following description and appended claims.

It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiment, with reference made to the accompanying drawings as follows.

DETAILED DESCRIPTION

Figure 1:
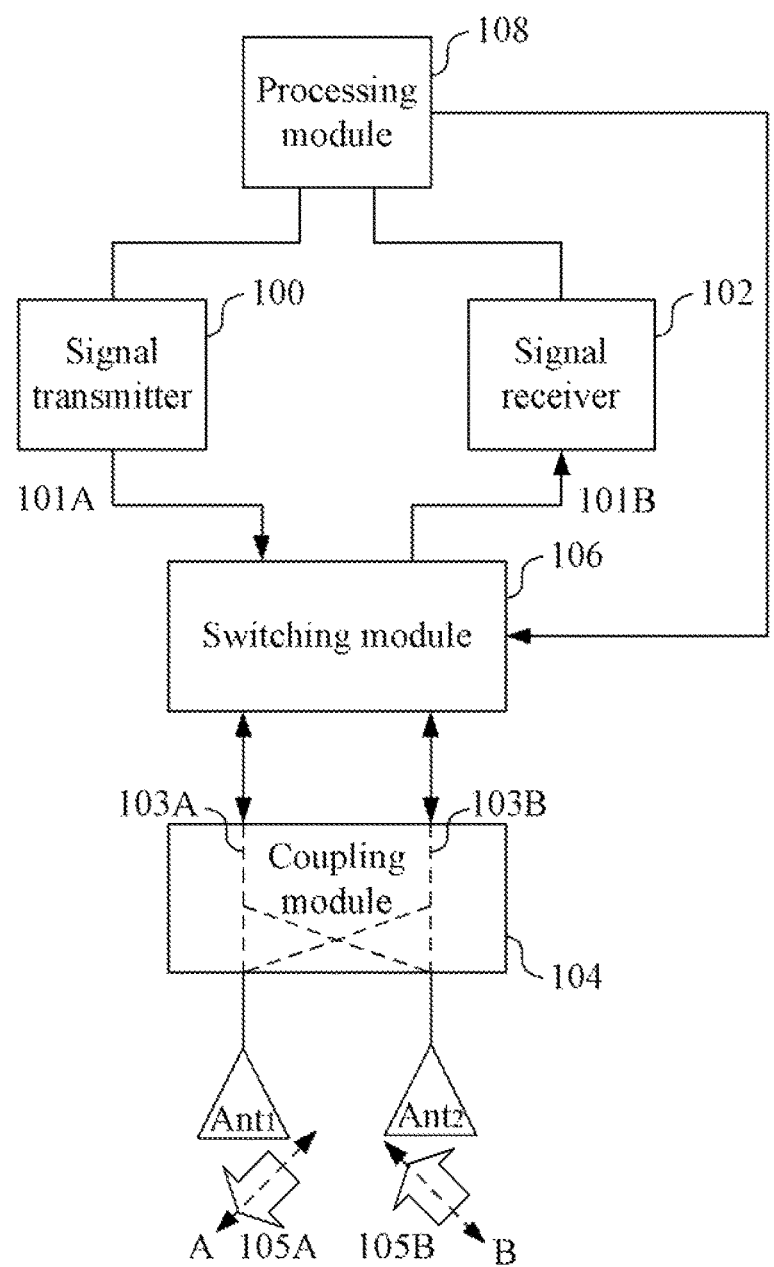
FIG. 1 is a block diagram of a radar detection system in an embodiment of the present invention.

Reference will now be made in detail to the present embodiments of the invention, examples of which are illustrated in the accompanying drawings. Wherever possible, the same reference numbers are used in the drawings and the description to refer to the same or like parts.

FIG. 1 is a block diagram of a radar detection system 1 in an embodiment of the present invention. The radar detection system 1 includes a signal transmitter 100, a signal receiver 102, a coupling module 104, two antennas Ant1, Ant2, a switching module 106 and a processing module 108.

The signal transmitter 100 and the signal receiver 102 perform signal transmission and receiving respectively. In an embodiment, the signal transmitter 100 generates an output high frequency signal 101A, and the signal receiver 102 receives an input high frequency signal 101B.

The coupling module 104 includes a first coupling path 103A and a second coupling path 103B each corresponding to a group of phase-shifting parameters, wherein the first and the second coupling paths 103A and 103B are different such that phase-shifting processes corresponding to different antennas Ant1 and Ant2 are performed on the signals passing through the first and the second coupling paths 103A and 103B. The antennas Ant1 and Ant2 are electrically connected to the first coupling path 103A and the second coupling path 103B to perform the signal transmission and the signal receiving.

The switching module 106 is electrically connected between the coupling module 104 and the signal transmitter 100 and the signal receiver 102 to electrically connect the signal transmitter 100 and the signal receiver 102 to one of the first coupling path 103A and the second coupling path 103B respectively under different operation modes.

For example, under a first operation mode, the switching module 106 electrically connects the signal transmitter 100 to the first coupling path 103A and connects the signal receiver 102 to the second coupling path 103B to perform the signal transmission and the signal receiving through the antennas Ant1 and Ant2. Under a second operation mode, the switching module 106 electrically connects the signal transmitter 100 to the second coupling path 103B and connects the signal receiver 102 to the first coupling path 103A to perform the signal transmission and the signal receiving through the antennas Ant1 and Ant2.

In an embodiment, after the phase-shifting process is performed by one of the first coupling path 103A and the second coupling path 103B on the output high frequency signal 101A generated by the signal transmitter 100, the antennas Ant1 and Ant2 deliver an output electromagnetic signal 105A outward. When the antennas Ant1 and Ant2 receive an input electromagnetic signal 105B from an external source, the antennas Ant1 and Ant2 convert the input electromagnetic signal 105B to the input high frequency signal 101B. After the phase-shifting process is performed by one of the first coupling path 103A and the second coupling path 103B on the input electromagnetic signal 105B, the input electromagnetic signal 105B is received by the signal receiver 102.

In an embodiment, the signal transmitter 100, the signal receiver 102 and the switching module 106 are further electrically connected to the processing module 108 and are under control of the processing module 108.

In an embodiment, the processing module 108 controls the switching module 106 to be operated under the first operation mode and the second operation mode. Moreover, the processing module 108 controls the signal transmitter 100 to generate the output high frequency signal 101A. After the output high frequency signal 101A is fed to the antennas Ant1 and Ant2 through the first coupling path 103A, the antennas Ant1 and Ant2 deliver the output electromagnetic signal 105A to an external object. Subsequently, the processing module 108 controls the signal receiver 102 to receive the input high frequency signal 101B through the second coupling path 103B that is converted from the input electromagnetic signal 105B bounced back from the external object and received by the antennas Ant1 and Ant2.

The processing module 108 determines a displacement, a velocity and a distance of the external object according to the output high frequency signal 101A and the input high frequency signal 101B to accomplish the radar detection mechanism. In an embodiment, the processing module 108 performs the determination according to the time difference, the intensity difference, the phase difference or a combination of the above between the delivering and receiving of the output high frequency signal 101A and the input high frequency signal 101B.

Figure 2A:
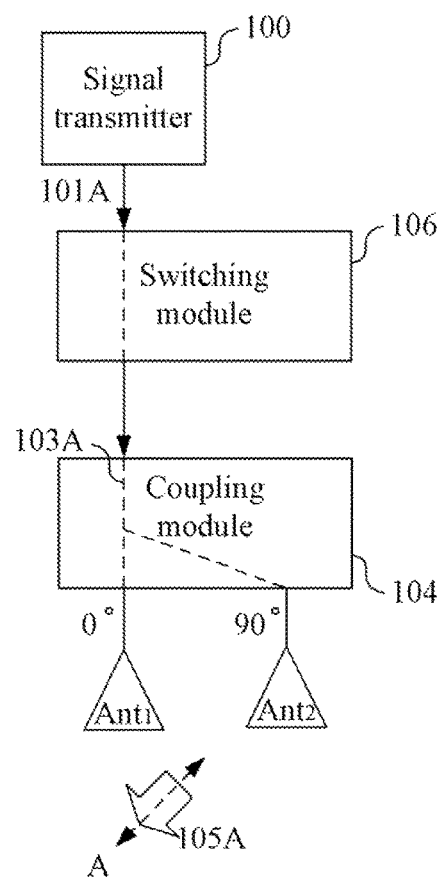
FIG. 2A is a diagram of the signal transmitter, the coupling module 104, the antennas and the switching module under the first operation mode in an embodiment of the present invention.
Figure 2B:
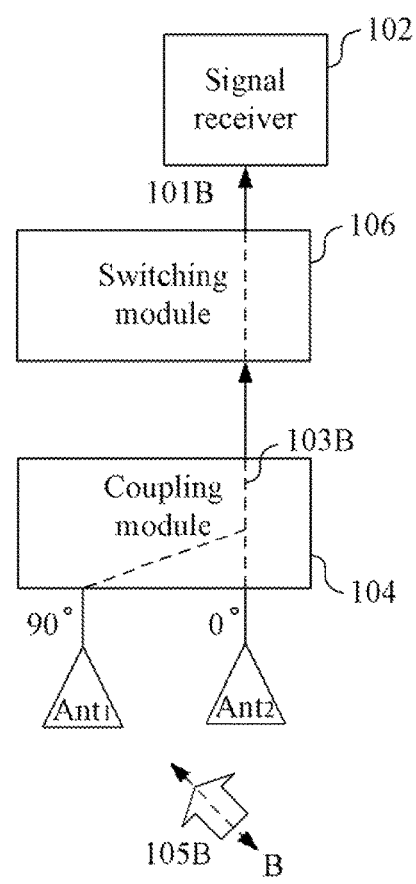
FIG. 2B is a diagram of the signal receiver, the coupling module, the antennas and the switching module under the first operation mode in an embodiment of the present invention.

FIG. 2A is a diagram of the signal transmitter 100, the coupling module 104, the antennas Ant1 and Ant2 and the switching module 106 under the first operation mode in an embodiment of the present invention. FIG. 2B is a diagram of the signal receiver 102, the coupling module 104, the antennas Ant1 and Ant2 and the switching module 106 under the first operation mode in an embodiment of the present invention.

As illustrated in FIG. 2A, under the first operation mode, the switching module 106 connects the signal transmitter 100 to the first coupling path 103A. In the present embodiment, the group of phase-shifting parameters corresponding to the first coupling path 103A includes a first angle corresponding to the antenna Ant1 and a second angle corresponding to the antenna Ant2, wherein the first angle is 0° and the second angle is 90°. As a result, the phase of the output high frequency signal 101A transmitted to the antenna Ant2 through the first coupling path 103A leads the phase of the output high frequency signal 101A transmitted to the antenna Ant1 for 90°.

Therefore, the output electromagnetic signal 105A delivered by the antennas Ant1 and Ant2 is a planar wave transmitted along an axis A, in which the axis A is perpendicular to the wavefront of the planar wave. The wireless signals delivered by the antennas Ant1 and Ant2 are strengthened to become a direct main wave because of the constructive interference. Since the phase of the signal delivered by the antenna Ant2 leads the phase of the signal delivered by the antenna Ant1, the transmission direction of the output electromagnetic signal 105A delivered by both of the antennas Ant1 and Ant2 is deflected toward the antenna Ant1.

On the other hand, as illustrated in FIG. 2B, the switching module 106 connects the signal receiver 102 to the second coupling path 103B under the first operation mode. In the present embodiment, the group of phase-shifting parameters corresponding to the second coupling path 103B includes the second angle corresponding to the antenna Ant1 and the first angle corresponding to the antenna Ant2, wherein the first angle is 0° and the second angle is 90°. As a result, the antennas Ant1 and Ant2 can receive the input electromagnetic signal 105B along an axis B. The phase of the input high frequency signal 101B converted by the antenna Ant2 is behind the phase of the input high frequency signal 101B converted by the antenna Ant1 for 90°. Therefore, the receiving direction of the input electromagnetic signal 105B received by the two antennas is deflected toward the antenna Ant1. Moreover, after the phase-shifting process performed by the second coupling path 103B, the input high frequency signal 101B generated according to the antenna Ant1 and the input high frequency signal 101B generated according to the antenna Ant2 become in-phase. The input high frequency signal 101B is received by the signal receiver 102 subsequently.

As a result, under the first operation mode, the antennas Ant1 and Ant2 can deliver the output electromagnetic signal 105A along the axis A according to the output high frequency signal 101A generated by the signal transmitter 100 after the phase-shifting process is performed by the first coupling path 103A on the output high frequency signal 101A. At the same time, the antennas Ant1 and Ant2 can receive the input electromagnetic signal 105B along the axis B and convert the input electromagnetic signal 105B to the input high frequency signal 101B. After the phase-shifting process is performed by the second coupling path 103B on the input high frequency signal 101B, the input high frequency signal 101B is received by the signal receiver 102.

Figure 3A:
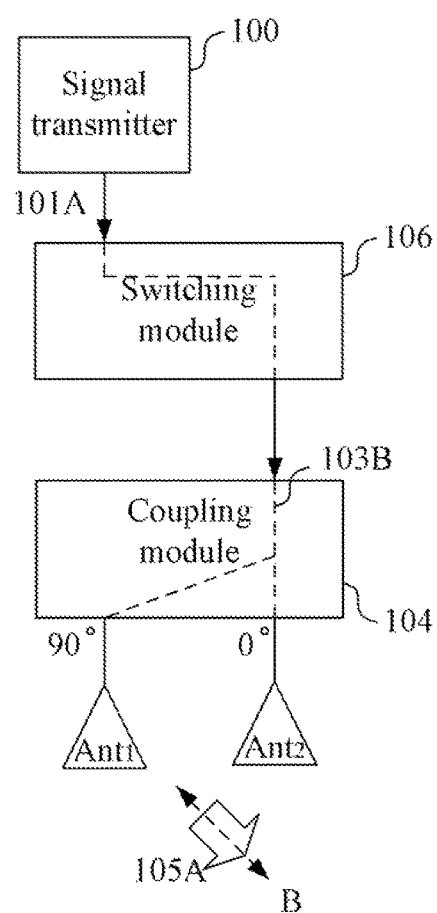
FIG. 3A is a diagram of the signal transmitter, the coupling module, the antennas and the switching module under the second operation mode in an embodiment of the present invention.
Figure 3B:
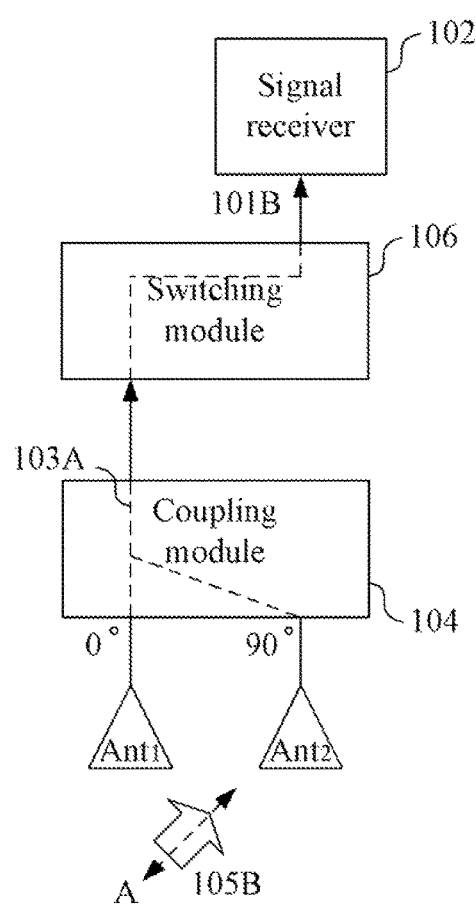
FIG. 3B is a diagram of the signal receiver, the coupling module, the antennas and the switching module under the second operation mode in an embodiment of the present invention.

FIG. 3A is a diagram of the signal transmitter 100, the coupling module 104, the antennas Ant1 and Ant2 and the switching module 106 under the second operation mode in an embodiment of the present invention. FIG. 3B is a diagram of the signal receiver 102, the coupling module 104, the antennas Ant1 and Ant2 and the switching module 106 under the second operation mode in an embodiment of the present invention.

As illustrated in FIG. 3A, under the second operation mode, the switching module 106 connects the signal transmitter 100 to the second coupling path 103B. In the present embodiment, the group of phase-shifting parameters corresponding to the second coupling path 103B includes the second angle corresponding to the antenna Ant1 and the first angle corresponding to the antenna Ant2, wherein the first angle is 0° and the second angle is 90°. As a result, the phase of the output high frequency signal 101A transmitted to the antenna Ant1 through the second coupling path 103B leads the phase of the output high frequency signal 101A transmitted to the antenna Ant2 for 90°.

Therefore, the output electromagnetic signal 105A delivered by the antennas Ant1 and Ant2 is a planar wave transmitted along the axis B, in which the axis B is perpendicular to the wavefront of the planar wave. The wireless signals delivered by the antennas Ant1 and Ant2 are strengthened to become a direct main wave because of the constructive interference. Since the phase of the signal delivered by the antenna Ant1 leads the phase of the signal delivered by the antenna Ant2, the transmission direction of the output electromagnetic signal 105A delivered by both of the antennas Ant1 and Ant2 is deflected toward the antenna Ant2.

On the other hand, as illustrated in FIG. 3B, the switching module 106 connects the signal receiver 102 to the first coupling path 103A under the second operation mode. In the present embodiment, the group of phase-shifting parameters corresponding to the first coupling path 103A includes the second angle corresponding to the antenna Ant2 and the first angle corresponding to the antenna Ant1, wherein the first angle is 0° and the second angle is 90°. As a result, the antennas Ant1 and Ant2 can receive the input electromagnetic signal 105B along an axis A. The phase of the input high frequency signal 101B converted by the antenna Ant1 is behind the phase of the input high frequency signal 101B converted by the antenna Ant2 for 90°. Therefore, the receiving direction of the input electromagnetic signal 105B received by the two antennas is deflected toward the antenna Ant2. Moreover, after the phase-shifting process performed by the second coupling path 103B, the input high frequency signal 101B generated according to the antenna Ant1 and the input high frequency signal 101B generated according to the antenna Ant2 become in-phase. The input high frequency signal 101B is received by the signal receiver 102 subsequently.

As a result, under the first operation mode, the antennas Ant1 and Ant2 can deliver the output electromagnetic signal 105A along the axis B according to the output high frequency signal 101A generated by the signal transmitter 100 after the phase-shifting process is performed by the first coupling path 103A on the output high frequency signal 101A. At the same time, the antennas Ant1 and Ant2 can receive the input electromagnetic signal 105B along the axis A and convert the input electromagnetic signal 105B to the input high frequency signal 101B. After the phase-shifting process is performed by the second coupling path 103B on the input high frequency signal 101B, the input high frequency signal 101B is received by the signal receiver 102.

Since the antennas Ant1 and Ant2 can deliver the output electromagnetic signal 105 along different axis and receive the input electromagnetic signal 105 along different axis under the first and the second operation modes, the radar detection system 1 can detect the object located on different axis. For example, the axis A is extended to correspond to a chest of a human body and the axis B is extended to correspond to a belly of the human body. As a result, the processing module 108 illustrated in FIG. 1 can determine the displacement and the frequency of expansion and contraction of the chest and the belly due to the breathing according to the output high frequency signal 101A and the input high frequency signal 101B to further determine the amplitude and the frequency of the waveform of the breathing.

It is noted that the embodiment described above is simply a possible usage scenario. In other embodiments, the radar detection system 1 can be used to detect other environments and objects. Moreover, the combination of the angles mentioned above is merely an example. In other embodiments, the combination of the angle may include 0° and 180°, 0° and 45° or other combinations to detect the objects on different axis.

In the conventional technology, each antennas is supposed to have a corresponding phase-shifting circuit disposed thereon. Complex control mechanism by using digital signal processing or mechanical switching elements is needed to accomplish the phase-shifting mechanism. As a result, the design of the radar detection system 1 of the present invention can connect the signal transmitter 100 and the signal receiver 102 to the coupling module 104 by using the switching module 106 to correspond to the coupling paths having different phase-shifting parameters to perform signal transmission and signal receiving along different direction. The cost and the area of the system are greatly reduced.

Figure 4:
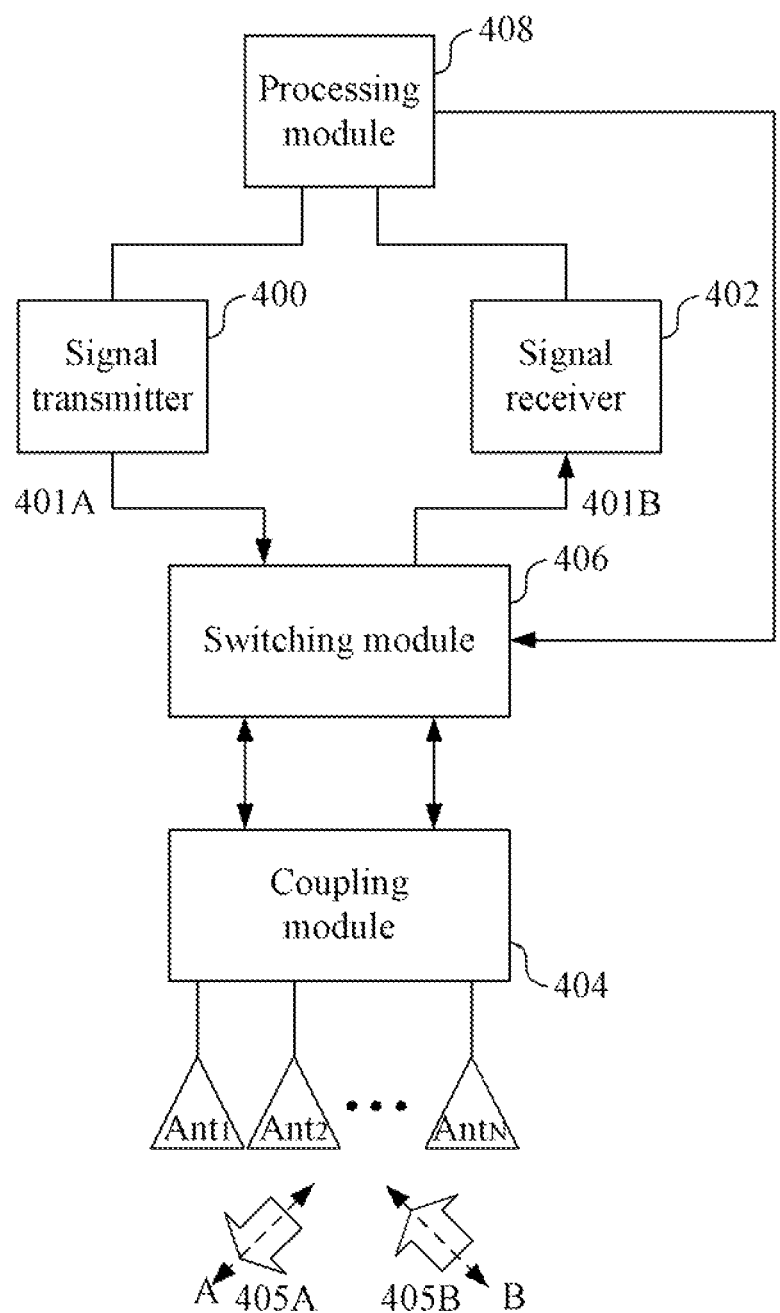
FIG. 4 is a block diagram of a radar detection system in an embodiment of the present invention.

FIG. 4 is a block diagram of a radar detection system 4 in an embodiment of the present invention. The radar detection system 4 includes a signal transmitter 400, a signal receiver 402, a coupling module 404, antennas Ant1, . . . , AntN, a switching module 406 and a processing module 408.

The signal transmitter 400 and the signal receiver 402 perform signal transmission and receiving respectively. In an embodiment, the signal transmitter 400 generates an output high frequency signal 401A, and the signal receiver 402 receives an input high frequency signal 401B.

The coupling module 104 includes a plurality of coupling paths (not illustrated). The coupling paths are similar to the coupling paths 103A and 103B illustrated in FIG. 1, in which each of the coupling paths corresponds to a group of phase-shifting parameters such that phase-shifting processes corresponding to different antennas Ant1 . . . AntN are performed on the signals passing through the coupling paths. The antennas Ant1 . . . AntN are arranged as an array and are electrically connected to the coupling paths respectively to perform the signal transmission and the signal receiving. In an embodiment, the coupling module 404 is implemented by a microwave circuit, such as but not limited to a circuit of Butler matrix array.

The switching module 406 is electrically connected between the coupling module 404 and the signal transmitter 400 and the signal receiver 402 to electrically connect the signal transmitter 400 and the signal receiver 402 to one of the coupling paths respectively under different operation modes.

In an embodiment, after the phase-shifting process is performed by one of the coupling paths on the output high frequency signal 401A generated by the signal transmitter 400, the antennas Ant1 . . . AntN deliver an output electromagnetic signal 405A outward. When the antennas Ant1 . . . AntN receive an input electromagnetic signal 405B from an external source, the antennas Ant1 . . . AntN convert the input electromagnetic signal 405B to the input high frequency signal 401B. After the phase-shifting process is performed by one of the coupling paths on the input electromagnetic signal 405B, the input electromagnetic signal 405B is received by the signal receiver 402.

In an embodiment, the signal transmitter 400, the signal receiver 402 and the switching module 406 are further electrically connected to the processing module 408 and are under control of the processing module 108.

In an embodiment, the processing module 408 controls the switching module 406 to be operated under different operation modes. Moreover, the processing module 408 controls the signal transmitter 400 to generate the output high frequency signal 401A. After the output high frequency signal 401A is fed to the antennas Ant1 . . . AntN through one of the coupling paths, the antennas Ant1 . . . AntN deliver the output electromagnetic signal 405A to an external object. Subsequently, the processing module 408 controls the signal receiver 402 to receive the input high frequency signal 401B through one of the coupling paths that is converted from the input electromagnetic signal 405B bounced back from the external object and received by the antennas Ant1 . . . AntN.

The processing module 408 determines a displacement, a velocity and a distance of the external object according to the output high frequency signal 401A and the input high frequency signal 401B to accomplish the radar detection mechanism. In an embodiment, the processing module 408 performs the determination according to the time difference, the intensity difference, the phase difference or a combination of the above between the delivering and receiving of the output high frequency signal 401A and the input high frequency signal 401B.

The phase-shifting parameters corresponding to each of the coupling paths include the angles corresponding to the antennas Ant1 . . . AntN such that phase-shifting processes corresponding to these angles that corresponds to the antennas Ant1 . . . AntN are performed on the output high frequency signal 401A to perform the signal transmission through the antennas Ant1 . . . AntN. Moreover, the phase-shifting processes corresponding to these angles that corresponds to the antennas Ant1 . . . AntN are performed on the input high frequency signal 401B received by the antennas Ant1 . . . AntN such that the signal receiver 402 performs the signal receiving. As a result, the radar detection system 4 can have more options of the coupling paths to transmit and receive the wireless signals on different axis according to different phase-shifting parameters. A wider range of radar detection can be accomplished.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A radar detection system, comprising:
   a signal transmitter;
   a signal receiver;
   a coupling module comprising a first and a second coupling paths, wherein the first and the second coupling paths are different;
   two antennas electrically connected to the first and the second coupling paths; and
   a switching module electrically connected between the coupling module and each of the signal transmitter and the signal receiver; and
   a processing module electrically connected to the signal transmitter, the signal receiver and the switching module;
   wherein under a first operation mode, the switching module connects the signal transmitter to the first coupling path such that the signal transmitter performs signal transmission from the two antennas according to a first group of phase-shifting parameters along a first axis external to the radar detection system through the first coupling path, and the switching module connects the signal receiver to the second coupling path such that the signal receiver performs signal receiving from the two antennas according to a second group of phase-shifting parameters along a second axis external to the radar detection system and different from the first axis through the second coupling path, the signal transmitter generates an output signal that is fed to the two antennas through the first coupling path such that the two antennas delivers an output electromagnetic signal along the first axis and the two antennas receives an input electromagnetic signal along the second axis to generate an input signal such that the signal receiver receives the input signal through the second coupling path;
   wherein under a second operation mode, the switching module connects the signal transmitter to the second coupling path such that the signal transmitter performs signal transmission from the two antennas according to the second group of phase-shifting parameters along the second axis through the second coupling path, and switching module connects the signal receiver to the first coupling path such that the signal receiver performs signal receiving from the two antennas according to the first group of phase-shifting parameters along the first axis through the first coupling path, the signal transmitter generates the output signal that is fed to the two antennas through the second coupling path such that the two antennas delivers the output electromagnetic signal along the second axis and the two antennas receives the input electromagnetic signal along the first axis to generate the input signal such that the signal receiver receives the input signal through the first coupling path;
   wherein the first group of phase-shifting parameters is determined by an electrical configuration of the first coupling path, and the second group of phase-shifting parameters is determined by the electrical configuration of the second coupling path;
   wherein the processing module is configured to control the switching module to be operated under the first and the second operation modes, to control the signal transmitter to generate the output signal, and to control the signal receiver to receive the input signal to determine a displacement, a velocity and a distance of an object located on the first axis and the second axis.

2. The radar detection system of claim 1, wherein the two antennas comprises a first antenna and a second antenna;
   the first group of phase-shifting parameters corresponding to the first coupling path comprise a first angle and a second angle such that under the first operation mode, the output signal generated by the signal transmitter is phase-shifted by the first angle and the second angle corresponding to the first antenna and the second antenna respectively such that the first antenna and the second antenna generate the output electromagnetic signal according to the phase-shifted output signal;

the second group of phase-shifting parameters corresponding to the second coupling path comprise the second angle and the first angle such that under the first operation mode, the input signal generated by the signal receiver according to the input electromagnetic signal is phase-shifted by the second angle and the first angle corresponding to the first antenna and the second antenna respectively such that the signal receiver receives the input signal.

3. The radar detection system of claim 2, wherein:

for the first coupling path under the second operation mode, the output signal generated by the signal transmitter is phase-shifted by the second angle and the first angle corresponding to the first antenna and the second antenna respectively such that the first antenna and the second antenna generate the output electromagnetic signal according to the phase-shifted output signal;

for the second coupling path under the second operation mode, the input signal generated by the signal receiver according to the input electromagnetic signal is phase-shifted by the first angle and the second angle corresponding to the first antenna and the second antenna respectively such that the signal receiver receives the input signal.

4. The radar detection system of claim 2, wherein under the first operation mode, when a phase corresponding to the second angle leads the phase corresponding to the first angle, a transmission direction of the output electromagnetic signal is deflected toward the first antenna, and a receiving direction of the input electromagnetic signal is deflected toward the first antenna.

5. The radar detection system of claim 3, wherein under the second operation mode, when the phase corresponding to the first angle leads the phase corresponding to the second angle, the transmission direction of the output electromagnetic signal is deflected toward the second antenna, and the receiving direction of the input electromagnetic signal is deflected toward the second antenna.

6. A radar detection system, comprising:
a signal transmitter;
a signal receiver;
a coupling module comprising a plurality of coupling paths;
a plurality of antennas arranged in an array electrically connected to the coupling paths respectively; and
a switching module electrically connected between the coupling module and each of the signal transmitter and the signal receiver; and a processing module electrically connected to the signal transmitter, the signal receiver and the switching module;

wherein under each of a plurality of operation modes, the switching module connects each of the signal transmitter and the signal receiver to one of the coupling paths such that the signal transmitter performs signal transmission through the antennas according to a group of phase-shifting parameters and the signal receiver performs signal receiving through the antennas each according to a group of phase-shifting parameters;

wherein under each of the operation modes, the signal transmission and the signal receiving through the antennas corresponds to different axes external to the radar detection system determined by the coupling paths, and under each of the operation modes, the signal transmitter generates an output signal that is fed to the antennas through one of the coupling paths such that the antennas delivers an output electromagnetic signal; and the antennas receive an input electromagnetic signal to generate an input signal such that the signal receiver receives the input signal through one of the coupling paths;

wherein each of the groups of phase-shifting parameters is determined by an electrical configuration of each of the coupling paths;

wherein the processing module is configured to control the switching module to be operated under the operation modes, to control the signal transmitter to generate the output signal, and to control the signal receiver to receive the input signal to determine a displacement, a velocity and a distance of an object.

7. The radar detection system of claim 6, wherein the group of phase-shifting parameters corresponding to each of the coupling paths comprise a plurality of angles of the antennas such that the output signal generated by the signal transmitter is phase-shifted by the angles corresponding to the antennas respectively such that the antennas generate the output electromagnetic signal according to the phase-shifted output signal;

the input signal generated by the signal receiver according to the input electromagnetic signal is phase-shifted by the angles corresponding to the antennas respectively such that the signal receiver receives the input signal.

8. The radar detection system of claim 6, wherein the coupling module is a microwave circuit.

* * * * *